Patented Sept. 7, 1937

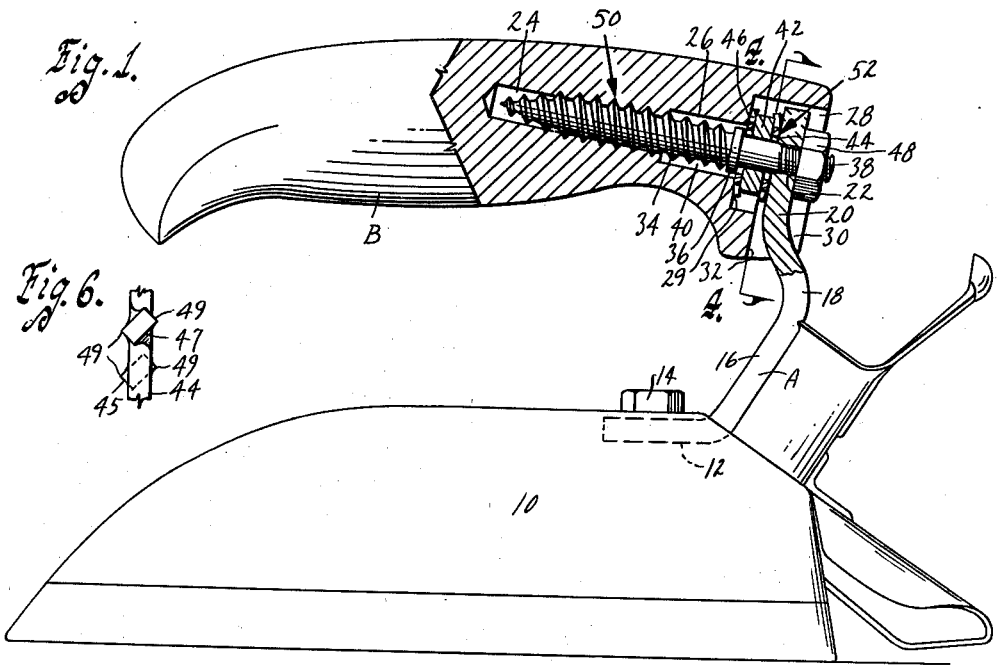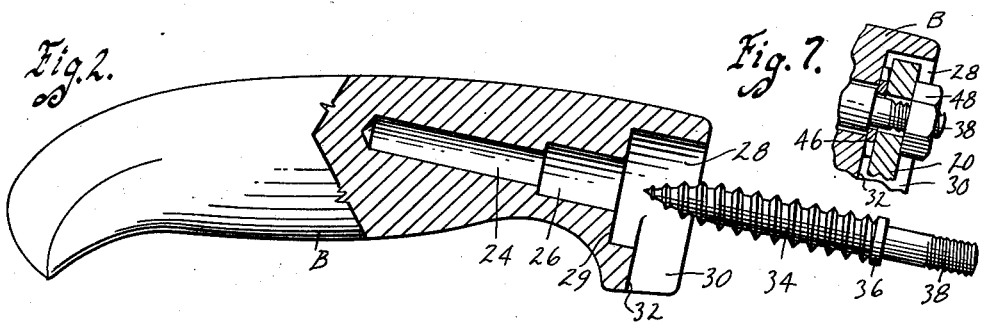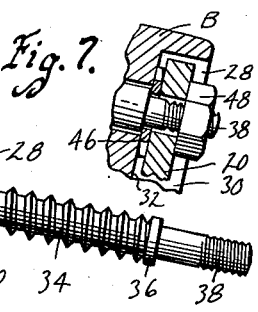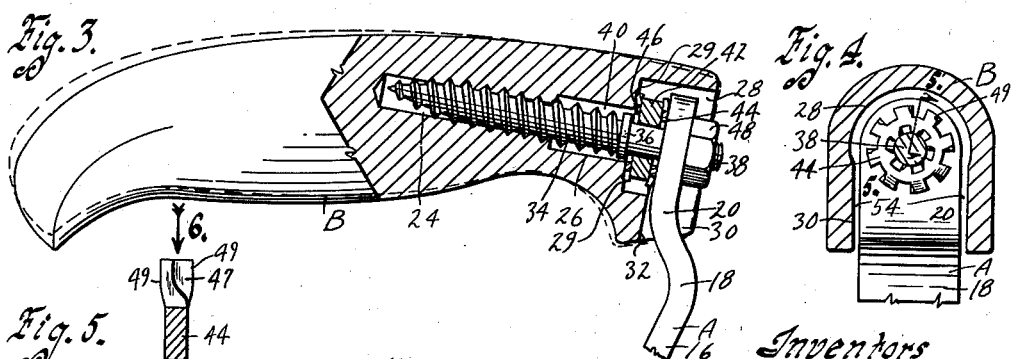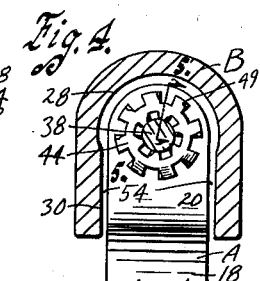

2,092,312

UNITED STATES PATENT OFFICE 2,092,312

HANDLE STRUCTURE FOR SADIRONS AND THE LIKE

Russell I. Huffman and Gwilym S. Braun, Dover, Ohio, assignors, by mesne assignments, to Knapp-Monarch Company, St. Louis, Mo., a corporation of Missouri Application March 5, 1936, Serial No. 67,294

8 Claims. (Cl. 38—90)

An object of our invention is to provide a handle structure of simple, durable and inexpensive construction for sadirons or other heated appliances, such handle structure being particularly designed for being mounted at one end only, and commonly called an "open end handle".

A further object is to provide a handle structure including a handle of wood or the like, and a handle support therefor extending from an electric appliance or the like and connected with one end of the handle, the parts being so designed, arranged and assembled relative to each other that there is a minimum of heat transmission from the handle support to the handle and from thence to the hand of the user.

Another object is to provide a connection between one end of the handle and a handle support which is specifically designed to prevent loosening of the handle or bending thereof caused by excessive pressure being applied to the handle, or in case the appliance is dropped and the handle strikes the floor, thereby placing an undue strain on the handle.

A further object is to provide an open end handle construction with an effective method of connecting the handle part to a handle support without the necessity of having to provide a through bolt from the front end of the handle to the handle support.

Further objects are to provide a two-point mounting for a handle support relative to a handle, and a type of connection between the handle support and handle which retains the parts rigidly assembled and minimizes breakage of the connection and/or bending of the handle structure.

With these and other objects in view, our invention consists in the construction, arrangement and combination of the various parts of the device, whereby the objects contemplated are attained, as hereinafter more fully set forth, pointed out in our claims, and illustrated in the accompanying drawing, in which:

Figure 1 is a side elevation of a sadiron showing our improved handle structure associated therewith, parts thereof being shown in section to illustrate the connection between the handle support and the handle of the handle structure.

Figure 2 is a similar side elevation of the handle part of the handle structure and a lag screw for assembly therewith.

Figure 3 is a sectional view similar to a portion of Figure 1, showing the normal position of the handle relative to the handle support in dotted lines, and a displaced position in solid lines to illustrate inherent advantages of the structure.

Figure 4 is a sectional view on the line 4—4 of Figure 1, showing a spring washer used in connection with our structure.

Figure 5 is an enlarged sectional view on the line 5—5 of Figure 4, showing the upper half of a lock washer used in connection with our handle structure.

Figure 6 is a view of the lock washer as viewed in the direction of the arrow 6 adjacent Figure 5; and Figure 7 is a sectional view similar to the upper right hand corner of Figure 1 showing a slight modification of the invention.

On the accompanying drawing we have used the reference numeral 10 to indicate generally a heated appliance such as an electric sadiron. Our handle structure includes a handle support A and a handle B.

The handle support A comprises a relatively flat piece of bar metal such as steel or the like, having an attaching portion 12 adapted for connection with the sadiron 10 by means of a cap screw or the like 14. The support A has an upstanding portion 16, an S-curved portion 18 and an upper end 20. The end 20 is perforated at 22.

The handle B may be made of wood or the like and is provided with an inner bore 24, an outer bore 26 and a socket 28. One side of the socket 28 extends as at 30 to the lower surface of the rear end of the handle, and the forward wall of this portion is indicated at 32.

For attaching the handle B to the handle support A we provide a rod means comprising a lag screw 34 having a shoulder 36 and a threaded shank 38. The bore 24 is slightly less in diameter than the diameter of the lag screw 34 at the peaks of its threads, whereby upon screwing the lag screw into the bore 24, the threads rigidly engage in the wood of the handle, as shown in Figure 1.

A suitable tool, of course, can be threaded onto the shank 38 and against the shoulder 36 for screwing the lag screw into the bore 24 and the tool then unscrewed from the lag screw.

The bore portion 26, it will be noted, is enlarged relative to the bore portion 24, and its internal diameter is substantially greater than the diameter of the lag screw at the peaks of its threads. This provides an air space 40, as shown in Figures 1 and 3, when the lag screw is in position in the handle. This air space we have found to be quite effective in reducing the transmission of heat from the lag screw to the material of the handle, as will hereinafter be more fully explained.

The perforation 22 of the handle support A is adapted to receive the shank 38 of the lag screw, a spacer 42 and a pair of spring washers 44 and 46 being interposed between the front wall 29 of the socket 28 and the portion 20 of the handle support A. The spring washers 44 and 46 may be of any type suitable for the purpose of preventing relative rotation of the spacer 42, the handle support A and the handle B under normal conditions, and serve as a means for retaining a nut 48 against loosening movement.

The nut 48 is threaded on the shank 38 against the back surface of the portion 20 of the handle support A for retaining the handle support in rigid connection with the rear end of the handle B. After this nut is once tightened, the spring washers 44 and 46 substantially prevent any further rotation thereof during the use of the iron.

The socket 28 and the portion 30 thereof, it will be noted by reference to Figure 4, are slightly larger than the handle support 20. This is to provide an air space around the handle support A, so that there is no direct transmission of heat from the support to the handle, the only transmission possible being through the front face of the spacer 42 and the portion of the lag screw 34, indicated by the arrow 50 in Figure 1. Since the point 50 is substantially remote from the handle support A, most of the heat is dissipated by the time it reaches the handle, and thus we are able to eliminate to a great degree the transmission of undesired heat to the handle. The air space 40, of course, serves the purpose of preventing any direct transmission of heat from the lag screw to the handle at this point.

With our construction, however, even though heat transmission is reduced to a minimum, there is a very rigid connection established between the handle and the handle support through the engagement of the handle support with the rear end of the handle, the spacer 42 and the washers 44 and 46 being interposed between the two.

By providing a two-point connection between the handle and the handle support, such as indicated by the arrows 50 and 52, a handle structure is provided which permits some give without damaging the handle. This is illustrated in Figure 3 in which the handle B has been sprung downwardly, resulting in a substantial pivotal movement of the handle about the point 50 and a slight sliding motion adjacent the point 52, such as between the washer 46 and the handle B, without, however, permitting any rotation of the washer relative to the handle.

The most suitable type of washer we have found to be the type shown in Figures 4, 5 and 6, having internal spring fingers 45 and external spring fingers 47. These are cut from the material of the washer and twisted as best shown in Figure 6, so as to present sharp edges indicated at 49, which engage in the material of the handle, the spacer and the handle support, the washer being hardened to facilitate such engagement.

We have found that such construction permits the movement above described in connection with Figure 3, when the sadiron is dropped on its handle, without any damage whatsoever to the iron, whereas with through bolt connections or the like either the handle support is bent or the bolt is broken. In some cases the through bolt does not break but does become loosened, and this is a disadvantage which is overcome by our construction.

With our construction the two point connection at 50 and 52 permits the giving of the handle illustrated in Figure 3, rather than bending or breaking of any of the parts. It will be noted that the wall 32 of the socket at the rear end of the handle is spaced from the handle support A and the handle support itself is bent away from the wall 32, which permits the giving mentioned even to a further degree than shown in Figure 3 under extremely adverse conditions, without this wall striking the handle support and thereafter causing either breakage of the handle, the lag screw or the handle support.

The lag screw 34 may be screwed into the bore 24 with a suitable cement or binder, so that after the lag screw is once positioned in the handle, it will not thereafter be loosened. The spring washers 44 and 46 substantially prevent any loosening of the nut 48 after it is tightened at the factory.

A further advantage of the enlarged bore portion 26 in the handle B is to prevent excessive transmission of heat to the handle adjacent the washer 46, which would tend to loosen the handle B at its point of contact with the teeth 47 of the washer 46.

The spacer 42 together with the spring washers 44 and 46 eliminate any turning of the handle relative to the handle support, so that the handle will remain in the position illustrated in Figure 4, and the air space 54 between the handle support and the sides 30 of the socket 28 are thus constantly maintained.

Although the spacer 42 is desirable, it can be eliminated, and yet provide a connection between the handle and handle support, which is very efficient. Such an arrangement is illustrated in Figure 7. Both the spacer and spring washer 44 are omitted, the spring washer 46, however, being retained to prevent loosening of the nut 48. The shank 38 of the lag screw 34 can be slightly shorter for this arrangement than for the arrangement shown in Figure 1.

Some changes may be made in the construction and arrangement of the parts of our device without departing from the real spirit and purpose of our invention, and it is our intention to cover by our claims any modified forms of structure or use of mechanical equivalents, which may be reasonably included within their scope.

We claim as our invention:

1. A sadiron handle construction comprising a handle, a handle support therefor, means for attaching one end thereof to a sadiron, means of connection for attaching the other end thereof to said handle, said means of connection comprising a lag screw, said handle having a bore adjacent one end thereof to receive said lag screw, the outer end of said bore being greater in diameter than said lag screw to provide a space between the lag screw and the inner surface of said bore to thereby substantially prevent transmission of heat from said lag screw to said end of said handle, the inner end of said lag screw being threaded into said handle and means for securing the outer end of said lag screw to said handle support.

2. A sadiron handle construction comprising a handle, a handle support therefor, means for attaching one end thereof to a sadiron, means of connection for attaching the other end thereof to said handle, said means of connection comprising a lag screw threaded into one end of said handle, said handle having a bore adjacent one end thereof to receive said lag screw, the outer end of said bore being of greater internal diameter than the external diameter of said lag screw to provide an air space between said lag screw and said handle within said bore to thereby substantially prevent transmission of heat from said lag screw to said end of said handle and means for securing the outer end of said lag screw to said handle support, said last means comprising an enlargement on the outer end of said lag screw, said handle support being perforated to receive the intermediate portion of said lag screw between the inner end thereof and said enlargement, said handle support being rigidly confined between said end of said handle and said enlargement.

3. A sadiron handle construction comprising a handle, a handle support therefor, means for attaching one end thereof to a sadiron, means of connection for attaching the other end thereof to said handle, said means of connection comprising a lag screw threaded into one end of said handle, said handle having a bore adjacent one end thereof to receive said lag screw, the outer end of said bore being greater in diameter than said lag screw and open to substantially prevent transmission of heat from said lag screw to said end of said handle and means for securing the outer end of said lag screw to said handle support, said last means comprising an enlargement on the outer end of said lag screw, said handle support being perforated to receive the intermediate portion of said lag screw, and a spacer on said lag screw between said handle support and said handle, said spacer and handle support being confined between the said end of said handle and said enlargement.

4. A sadiron handle construction comprising a handle, a handle support therefor, means for attaching one end thereof to a sadiron, means of connection for attaching the other end thereof to said handle, said means of connection comprising a lag screw threaded into one end of said handle, said handle having a bore adjacent one end thereof to receive said lag screw, the outer end of said bore being greater in diameter than said lag screw and open to substantially prevent transmission of heat from said lag screw to said end of said handle and means for securing the outer end of said lag screw to said handle support, said last means comprising an enlargement on the outer end of said lag screw, said handle support being perforated to receive the intermediate portion of said lag screw between the inner end thereof and said enlargement, a spacer on said lag screw between said handle support and said handle, said spacer and handle support being confined between the said end of said handle and said enlargement, and lock washers between said spacer and the handle and between said spacer and the handle support.

5. In combination with a heated appliance, a handle structure comprising a handle support connected with said appliance and extending therefrom, a handle having a bore, a lag screw extending into said bore, an air space being provided within said bore encompassing the outer portion of said lag screw, an enlargement on said lag screw adjacent the outer end of said bore, said handle support being perforated to receive said lag screw and being confined between said enlargement and the said end of said handle, said handle having a socket receiving the perforated portion of said handle support, said socket being enlarged to provide an air space surrounding said perforated portion of said handle support.

6. In combination with a heated appliance, a handle structure comprising a single handle support connected with said appliance and extending therefrom, a handle having a bore, a rod having one end extending into said bore and connected with said handle intermediate the ends thereof only and means on the outer end of said rod for retaining said handle support connected with said rod.

7. In combination with a heated appliance, a handle structure comprising a handle support connected with said appliance and extending therefrom, a handle having a bore, a rod having one end extending into said bore and connected with said handle, a spacer at one end of said handle and on said rod, means on the outer end of said rod for retaining said handle support in engagement with said spacer and said spacer being interposed between said end of said handle and the handle support, the outer end of said handle bore being larger than the diameter of and free of heat conducting contact with said rod, and said handle support being spaced from the end of said handle to permit a slight shifting of said handle relative to said handle support upon excessive strain on said handle tending to bend it relative to said handle support.

8. In combination with a heated appliance, a handle structure comprising a handle support connected with said appliance and extending therefrom, a handle having a stepped bore, a rod having one end extending into said bore and connected with said handle, a portion of said rod being spaced from the stepped portion on said bore to provide a first air space, and means on the outer end of said rod for retaining said handle support connected therewith, said handle having a socket receiving the portion of said handle support connected with said rod, said socket being enlarged to provide a second air space between the walls thereof and said handle support.

GWILYM S. BRAUN.
RUSSELL I. HUFFMAN.